United States Patent Office 2,817,751
Patented Dec. 24, 1957

2,817,751
WELDING ELECTRODE

Charles E. Phillips, Detroit, Mich.; Charles A. Dean, executor of the estate of said Phillips No Drawing. Application March 1, 1954
Serial No. 413,469

8 Claims. (Cl. 219—146)

The invention relates to welding electrodes and more particularly to a fabricated electrode of two or more assembled parts of different composition, as distinguished from a homogeneous composition.

It is known to provide electrodes for welding purposes with a core of one metal surrounded by a sheath of another metal and having an outer flux coating. An electrode of this type which has been used commercially consists of a copper core with a steel sheath, the ratio of copper to steel being about 75% to 25%.

The present invention is an improvement in welding electrodes having advantages as hereinafter set forth.

One of the features of the invention is due to my discovery of certain critical proportions of the metal constituents necessary to achieve certain desirable welding effects. I have found that a fabricated electrode of assembled copper and steel parts should use about equal amounts of copper and steel rather than a large excess of copper over steel. The use of substantially equal percentages of copper and steel give an electrode which will satisfactorily weld any grade of gray cast iron. Furthermore, my new electrode eliminates certain objections which have heretofore been encountered when using fabricated electrodes of copper and steel of the compositions and ratios previously available to the welding art.

Another feature of my invention resides in the improved composition of the electrode whereby it may be used for applying multiple beads or layers without necessitating the use of a separate rod of different composition to feed into the arc pool. Where a second rod of different composition is employed, it requires the operator to use both hands and makes a difficult welding operation. This is eliminated by my invention. The fabricated electrode of my invention is provided with an ingredient which makes it possible to apply multiple beads or layers without any auxiliary welding rod. According to my invention, the flux coating contains manganese titanium or other suitable manganese-containing material which introduces manganese into the weld deposit such, for example, as ferromanganese, manganese boron, nickel manganese, cupromanganese, etc.

The weld deposit made by my electrode is superior to that heretofore obtained by other welding electrodes and is a feature of my invention. For different grades of cast iron, the manganese content of the weld deposit may be varied but, in general, it is desirable to have between 0.25 and 2.00% manganese.

A further feature of the present invention is that the welding electrode can be used with alternating current welding apparatus which cannot be done with certain prior art electrodes. My electrode is also satisfactory for D. C. welding machines.

An example of an electrode made in accordance with this invention is one composed of a central cylindrical core of copper surrounded by an annular sheath of steel of such thickness compared to the diameter of the core that the copper and steel are each present in the same amount by weight, i. e. 50% copper and 50% steel. The steel sheath is enveloped by a flux coating of the following composition in parts by weight:

| | |
|---|---|
| Calcium carbonate | 25 |
| Calcium fluoride | 9 |
| Carbon | 5 |
| Manganese titanium | 1.5 |
| Sodium silicate binder | 5 to 6 |

The ratio of copper to the total of copper and steel may be varied within limits and I have found it satisfactory in some cases to use a fabricated welding rod where the copper is 40% and the steel 60%. While my invention contemplates also a slight excess of copper over steel and the copper may be as high as 60% in some instances, the beneficial effects of my invention are best obtained by holding the copper to less than an extreme maximum of 65%. On the other hand, the amount of copper may be substantially less than the amount of steel, for example, the lower limt may be as low as 35% in some cases. While the above range is within my invention considered in its broader aspects, the preferred ratio is substantially equal amounts of both metals or, in other words, 50% copper and 50% steel.

The flux coating given in the above example has been found to give very satisfactory results but the main ingredients thereof are not critical and other flux compositions may also be used with the fabricated composite bimetal electrode of this invention.

What I claim as my invention is:

1. A welding electrode comprising a copper core surrounded by an annular steel sheath, the ratio of copper to the total of copper and steel being from 35 to 60% and a surrounding exterior flux coating.

2. A welding electrode comprising a copper core surrounded by an annular steel sheath of substantially equal amount by weight and a surrounding exterior flux coating.

3. A welding electrode according to claim 1 in which said flux coating includes manganese in a form recoverable as an alloying ingredient in the deposited metal.

4. A welding electrode according to claim 2 in which said flux coating includes manganese in a form recoverable as an alloying ingredient in the deposited metal.

5. A welding electrode comprising a copper core surrounded by an annular steel sheath of substantially equal amount by weight and having a surrounding flux coating comprising about 25 parts of calcium carbonate, 9 parts of calcium fluoride, 5 parts of carbon, 1.5 parts of manganese titanium, and 5 to 6 parts of sodium silicate binder.

6. A welding electrode comprising a copper core surrounded by an annular steel sheath, the ratio of copper to the total of copper and steel being 60% and a surrounding exterior flux coating which includes manganese in a form recoverable as an alloying ingredient in the deposited metal.

7. A welding electrode comprising a copper core surrounded by an annular steel sheath, the ratio of copper to the total of copper and steel being 60%, and having a surrounding flux coating comprising the following composition in parts by weight:

| | |
|---|---|
| Calcium carbonate | 25 |
| Calcium fluoride | 9 |
| Carbon | 5 |
| Manganese titanium | 1.5 |
| Sodium silicate binder | 5 to 6 |

8. A welding electrode comprising a copper core surrounded by an annular steel sheath, the ratio of copper to the total of copper and steel being from 35 to 60%, and having a surrounding flux coating comprising about 25 parts calcium carbonate, 9 parts calcium fluoride, 5 parts carbon, 1.5 parts manganese titanium, and 5 to 6 parts sodium silicate binder.

References Cited in the file of this patent

UNITED STATES PATENTS

| | | |
|---|---|---|
| 1,061,376 | Heany | May 13, 1913 |
| 1,189,581 | Kicklighter | July 4, 1916 |
| 1,437,257 | Mattice | Nov. 28, 1922 |
| 1,679,518 | Fowle | Aug. 7, 1928 |
| 1,926,090 | Frickey et al. | Sept. 12, 1933 |
| 2,001,848 | Nyquist | May 21, 1935 |
| 2,010,605 | Miller | Aug. 6, 1935 |
| 2,051,358 | Zublin | Aug. 18, 1936 |
| 2,231,917 | Jones | Feb. 18, 1941 |
| 2,301,320 | Phillips et al. | Nov. 10, 1942 |

OTHER REFERENCES

Alloys of Iron and Copper, pages 98–104, edited by Gregg et al. Published in 1934 by McGraw-Hill Book Co., New York.

The Making, Shaping, and Treating of Steel, sixth edition, published in 1951 by United States Steel Company, page 534.